(12) United States Patent
Sarkar

(10) Patent No.: US 11,797,279 B2
(45) Date of Patent: *Oct. 24, 2023

(54) SYSTEMS AND METHODS FOR DEPENDENCY ANALYSIS

(71) Applicant: CodeLogic, Inc., San Francisco, CA (US)

(72) Inventor: Soumik Sarkar, Redwood City, CA (US)

(73) Assignee: CodeLogic, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/839,061

(22) Filed: Jun. 13, 2022

(65) Prior Publication Data

US 2022/0308846 A1    Sep. 29, 2022

Related U.S. Application Data

(63) Continuation of application No. 16/824,597, filed on Mar. 19, 2020, now Pat. No. 11,360,751.

(51) Int. Cl.
*G06F 8/41* (2018.01)
*G06F 8/75* (2018.01)

(52) U.S. Cl.
CPC .............. *G06F 8/433* (2013.01); *G06F 8/75* (2013.01)

(58) Field of Classification Search
CPC .................................... G06F 8/75; G06F 8/433
See application file for complete search history.

(56) References Cited

U.S. PATENT DOCUMENTS

| | | | |
|---|---|---|---|
| 8,726,392 B1 | 5/2014 | McCorkendale et al. | |
| 2011/0231836 A1 | 9/2011 | Wookey | |
| 2013/0297605 A1 | 11/2013 | Cohen | |
| 2014/0068573 A1 | 3/2014 | Brewis et al. | |
| 2015/0143339 A1 | 5/2015 | Rajanna et al. | |
| 2016/0253185 A1 | 9/2016 | Goldstein et al. | |
| 2017/0090889 A1 | 3/2017 | Hale et al. | |
| 2017/0314800 A1 | 11/2017 | Bengea et al. | |
| 2017/0037329 A1 | 12/2017 | De Bellis | |
| 2018/0131558 A1 | 5/2018 | Sharma | |
| 2018/0336020 A1 | 11/2018 | Berg et al. | |
| 2020/0401386 A1* | 12/2020 | Punathil | G06F 8/433 |
| 2021/0232392 A1* | 7/2021 | Azuma | G06F 8/75 |

OTHER PUBLICATIONS

International Search Report and Written Opinion for PCT/US2021/023082 (ISA/US) dated Jun. 11, 2021.
U.S. Appl. No. 16/824,597, filed Mar. 19, 2020, U.S. Pat. No. 11,360,751, Issued.

* cited by examiner

*Primary Examiner* — Wei Y Zhen
*Assistant Examiner* — Amir Soltanzadeh
(74) *Attorney, Agent, or Firm* — Alston & Bird LLP; Neal J. McLaughlin

(57) ABSTRACT

An analysis of software stored and executing on one or more assets in an enterprise includes determining a hierarchy of nodes in the software and among the assets and analyzing dependencies among those nodes and assets through a static analysis of the software as it is stored as well as through a dynamic analysis of the software as it executes.

13 Claims, 1 Drawing Sheet

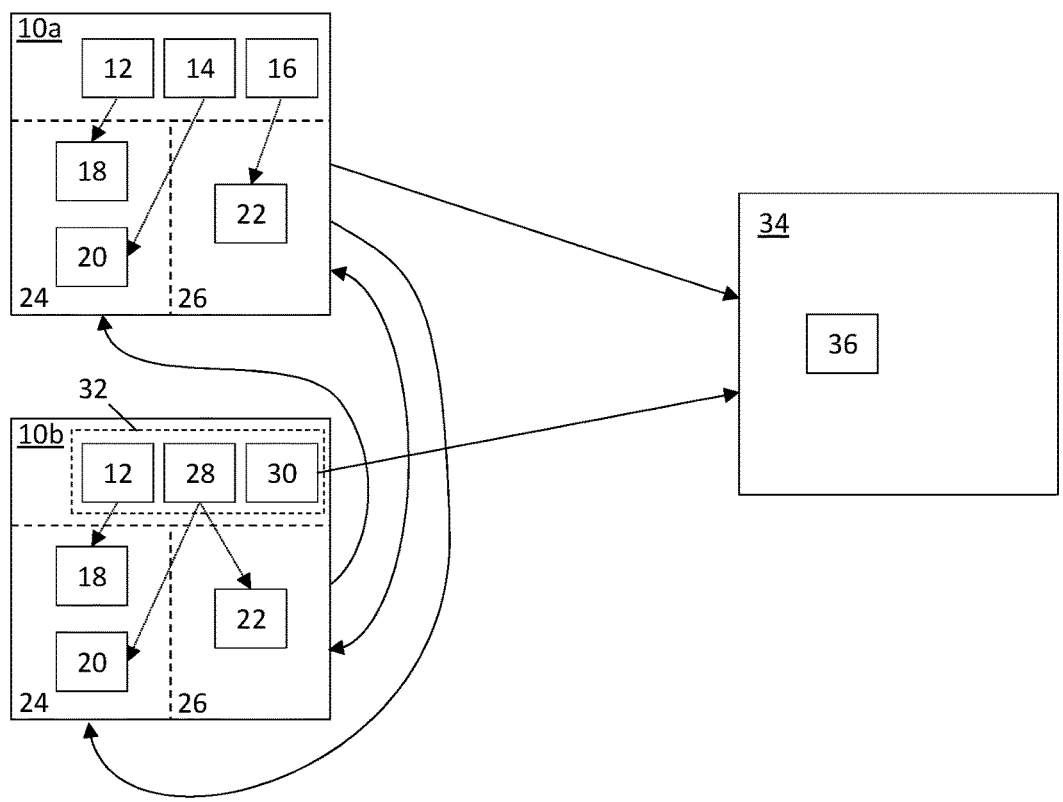

SYSTEMS AND METHODS FOR DEPENDENCY ANALYSIS

CROSS REFERENCE TO RELATED APPLICATIONS

This application is a continuation of U.S. patent application Ser. No. 16/824,597, filed Mar. 19, 2020, which is hereby incorporated by reference in its entirety.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

BACKGROUND

The present innovations generally address tools for detecting, analyzing and monitoring dependencies between and among assets throughout an enterprise. Modern enterprises rely on ever more complex mosaics and webs of software (including application code and databases) to manage, monitor and carry out their businesses. Often, for example, pieces of code in one area of an enterprise's software architecture are copied from or rely on data or pieces of code in a different area of the enterprise's software architecture.

These interdependencies have the benefit of making initial build-out more efficient and removing barriers to the flow of data within an enterprise during normal operation. However, if bugs in the code are identified or if updates are otherwise necessary, tracking which pieces of code require attention or may be impacted by a change or update becomes an extremely complex, time consuming and error-prone task.

Thus, there is a need for a way to efficiently analyze an enterprise's assets to identify dependencies. Also, because assets may have dependencies that only become evident at run-time, there is a need for tools to perform a static analysis of assets as well as to dynamically analyze assets at runtime for dependencies.

In order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BRIEF SUMMARY

The subject of this disclosure relates to systems and methods for analyzing computer software to identify hierarchies, dependencies and other relationships among portions of the software of an enterprise.

In one aspect, a computer-implemented method for analyzing software dependencies comprises, on a first asset, executing a first technology agent configured to analyze a first type of software stored in memory of the first asset, the analysis comprising identifying nodes within a particular portion of software of the first type, for each node, assigning an ID based on a hash of content related to the node, recording a hierarchy of the nodes within the software using the node IDs, performing a static analysis of the particular portion of software of the first type to identify any dependencies between that particular portion of software and other portions of software, and communicating the hierarchy and the dependencies to a synthesis agent; and on the first asset, executing a second technology agent configured to analyze a second type of software stored in memory of the first asset, the analysis comprising identifying nodes within a particular portion of software of the second type, for each node, assigning an ID based on a hash of content related to the node, recording a hierarchy of the nodes within the software using the node IDs, performing a static analysis of the particular portion of software of the second type to identify any dependencies between that particular portion of software and other portions of software, and communicating the hierarchy and the dependencies to the synthesis agent.

In one example, the node IDs are assigned based on a hash of the entire content of the node.

In another example, the node IDs of functions are assigned based on a hash of the signatures of the functions. A function signature may comprise a name of the function, any return values of the function and any parameters of the function.

In some implementations, the first technology agent and second technology agent are provided within a core agent.

In some implementations, the synthesis agent resides on the first asset.

In some implementations, the synthesis agent resides on an asset different than the first asset, both assets being within the same enterprise.

In some implementations, the synthesis agent resides at an asset outside an enterprise of the first asset.

In some implementations, the synthesis agent is configured to analyze the results from the first technology agent and the second technology agent to synthesize a dependency graph that records the hierarchy and dependencies among the identified nodes.

In one example, the method further comprises, on the first asset, executing a third technology agent configured to analyze a particular type of software executing on the first asset, the analysis comprising performing a dynamic analysis of a particular portion of software of the particular type executing on the first asset to identify any dependencies between that particular portion of software and other portions of software, and communicating the identified dependencies to the synthesis agent. In some implementations, the analysis performed by the third technology agent is based at least in part on any dependencies identified by the first technology agent.

In another aspect, a computer-implemented method for analyzing software dependencies comprises, on a first asset, executing a first technology agent configured to analyze a particular portion of software stored in memory of the first asset, the analysis comprising identifying nodes within the particular portion of software, for each node, assigning an ID based on a hash of content related to the node, recording a hierarchy of the nodes within the software using the node IDs, performing a static analysis of the particular portion of software to identify any dependencies between that particular portion of software and other portions of software, and communicating the hierarchy and the dependencies to a synthesis agent; and on a second asset, executing a second technology agent configured to analyze a particular portion of software stored in memory of the second asset, the analysis comprising identifying nodes within the particular portion of software, for each node, assigning an ID based on a hash of content related to the node, recording a hierarchy of the nodes within the software using the node IDs, performing a static analysis of the particular portion of software to identify any dependencies between that particular portion of software and other portions of software, and communicating the hierarchy and the dependencies to a synthesis agent.

In some implementations, the synthesis agent resides on one of the first asset and the second asset.

In some implementations, the synthesis agent resides on an asset different than the first asset and the second asset, but on an asset within a same enterprise as the first and second enterprise.

In some implementations, the synthesis agent resides at an asset outside an enterprise of the first and second assets.

In some implementations, the synthesis agent is configured to analyze the results from the first technology agent and the second technology agent to synthesize a dependency graph that records the hierarchy and dependencies among the identified nodes.

In one example, the method further comprises, on the first asset, executing a third technology agent configured to analyze software executing on the first asset, the analysis comprising performing a dynamic analysis of a particular portion of software executing on the first asset to identify any dependencies between that particular portion of software and other portions of software, and communicating the identified dependencies to the synthesis agent. In some implementations, the analysis performed by the third technology agent is based at least in part on any dependencies identified by the first technology agent.

In another aspect, a computer-implemented method for analyzing software dependencies comprises, on a first asset, executing a first technology agent configured to analyze a particular portion of software stored in memory of the first asset, the analysis comprising identifying nodes within the particular portion of software, for each node, assigning an ID based on a hash of content related to the node, recording a hierarchy of the nodes within the software using the node IDs, performing a static analysis of the particular portion of software to identify any dependencies between that particular portion of software and other portions of software, and communicating the hierarchy and the dependencies to a synthesis agent; and on the first asset, executing a second technology agent configured to analyze software executing on the first asset, the analysis comprising performing a dynamic analysis of a particular portion of software executing on the first asset to identify any dependencies between that particular portion of software and other portions of software, and communicating the identified dependencies to the synthesis agent.

In some implementations, the analysis performed by the second technology agent is based at least in part on any dependencies identified by the first technology agent.

BRIEF DESCRIPTION OF THE DRAWINGS

The accompanying drawings illustrate various non-limiting, example, innovative aspects in accordance with the present descriptions:

FIG. 1 is an overview schematic of an exemplary embodiment.

DETAILED DESCRIPTION

Embodiments of systems and methods for analyzing software dependency are described herein. While aspects of the described systems and methods can be implemented in any number of different configurations, the embodiments are described in the context of the following exemplary configurations. The descriptions and details of well-known components and structures are omitted for simplicity of the description, but would be readily familiar to those having ordinary skill in the art.

The description and figures merely illustrate exemplary embodiments of the inventive systems and methods. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter and the concepts contributed by the inventors to furthering the art, and are to be construed as being without limitation to such specifically recited examples and conditions. Moreover, all statements herein reciting principles, aspects, and embodiments of the present subject matter, as well as specific examples thereof, are intended to encompass all equivalents thereof.

In general, the systems and methods described herein may relate to improvements to aspects of using computers to analyze hierarchies, dependencies and other relationships among various portions of computer software. These improvements not only improve the functioning of how such a computer (or any number of computers deployed in an enterprise) is able to operate by mapping the architecture and hierarchies within an enterprise's software as well as by identifying dependencies among portions of software in the code as it is stored statically in memory as well as among various portions of software dynamically executing within the enterprise. These computer-implemented tasks are implemented to solve computer-specific problems. The problem and goal of trying to identify software architectures, hierarchies and dependencies are not ones that exist outside of the computer or computer software fields or even in a generic computer. Rather, they are problems unique to and solved with respect to the particular assets (examples of which are described below) deployed throughout an enterprise and the software stores and executing on those assets.

Within an enterprise's software architecture, assets may be configured to store, execute and record the results of various pieces of software. Assets may be physical and/or virtual and examples include servers, desktop computers, laptop computers, smartphones, virtual machines, cloud computing environments or portions thereof, etc. Software residing in and/or executing on assets within the enterprise can include, for example, applications, databases, etc. and portions thereof.

In one embodiment, technology agents are distributed among the assets to analyze software residing and/or executing at those assets. In general, technology agents are configured to analyze one or more particular types of target software. For example, one technology agent may be configured to analyze binary Java code while another may be configured to analyze source code written in C and still another may be configured to analyze JSON databases.

Multiple complimentary technology agents may be configured to analyze the same type of software. For example, one technology agent may be configured to analyze popular third-party Java libraries while another technology agent at the same asset may be configured to analyze custom Java libraries. Technology agents may also be configured to analyze multiple types of software.

Technology agents may be configured to perform static analysis and/or dynamic analysis of software. The same technology agent may be configured to perform both static and dynamic analysis or such analyses may be performed by separate technology agents for a given software type. For example, one technology agent may be configured to perform static analysis of Java libraries as they are stored at an asset, while another technology agent at the same asset may be configured to dynamically monitor and analyze API consumers accessing Java APIs hosted by the asset.

Multiple technology agents may be bundled together in a core agent. Such a core agent may be distributed to an asset to provide a toolbox of different technology agents configured for specific uses, some of which may not always be necessary for analysis of the software at the asset. Alternatively, an asset may be provided with specific, individual technology agents corresponding to the types of software present and/or executing at the asset. Core agents may also include communication tools for assisting communication of results from technology agents. Core agents may also be configured to be installed at an asset, survey the software stored and executing at that asset and then retrieve technology agents from a repository that are configured to analyze the software surveyed at the asset. Core agents may also be configured to facilitate periodic updating of the technology agents should a newer version become available.

Technology agents may be configured to perform static and/or dynamic analysis of software and report their results to one or more synthesis agents configured to receive, aggregate and analyze results from each of the technology agents active in an enterprise. One or more synthesis agents may reside at an asset within an enterprise or may be hosted by a third party. For example, results from technology agents may be provided to one or more third party synthesis agents hosted on a third-party server or within a third party's cloud computing environment.

FIG. 1 provides an overview schematic of an exemplary embodiment. In the example shown, two exemplary assets 10a, 10b of an enterprise are depicted, with the understanding that the enterprise could include more assets that are not shown. Asset 10a is shown as including three technology agents 12, 14, 16, with the understanding that the asset 10a could include more technology agents that are not shown. Exemplary asset 10a is shown as including in its nonvolatile storage 24 two pieces of software 18 and 20. In the example of FIG. 1, software 18 is of type A and software 20 is of type B. Exemplary asset 10a is also shown as executing software 22 from volatile memory 26. In the example shown in FIG. 1, software 22 is of type B.

In exemplary asset 10a, the technology agents 12, 14, 16 are individually loaded onto the asset and pointed towards the software stored and running at the asset. In the example shown in FIG. 1, technology agent 12 is configured to perform static analysis of type A software (e.g., 18), technology agent 14 is configured to perform static analysis of type B software (e.g., 20) and technology agent 16 is configured to perform dynamic analysis of executing type B software (e.g., 22). Technology agents 12, 14, 16 may be configured to communicate their analysis results directly or another component of asset 10a may be configured to perform this function.

Exemplary asset 10b shown in FIG. 1 is shown as including a core agent 32 that includes technology agent 12, configured to perform static analysis of type A software (e.g., 18), technology agent 28, configured to perform static and dynamic analysis of type B software (e.g., 20 and 22, respectively), and communications tool 30, configured to communicate the analysis results of the technology agents included in the core agent 32.

As shown in FIG. 1, the executing software 22 on each of the assets 10a, 10b may be configured to access static and/or executing software (18, 20 and/or 22) at the other asset. These accesses, relationships and dependencies may be identified and analyzed by the technology agents (16, 28) configured to perform dynamic analysis of the executing software 22.

In the example shown in FIG. 1, results of technology agents' analyses are communicated to a synthesis agent 36 at a third party asset 34 for further analysis.

In another embodiment, software from assets in an enterprise may be evaluated by technology agents not co-located on an asset with the software. For example, software may be provided to one or more third party assets for analysis by technology agents hosted by the third party. Results from the technology agents may be communicated to one or more synthesis agents at the third-party asset(s) that perform the static and dynamic analysis.

In yet another embodiment, software may be analyzed by a technology agent at a different asset from that in which the software is being developed or at which the software is stored or performed. For example, software being developed in a development environment may be exported to an analysis asset within an enterprise for analysis by an appropriate technology agent. In another example, an asset in an enterprise is configured to host technology agents configured to analyze software residing and executing in an enterprise. In this example, technology agents may not be located at the same assets storing and executing the software.

It is important to note that throughout the present disclosure, when one asset is described as a particular type of asset (i.e., analysis asset, synthesis asset, etc.), that function is not necessarily to the exclusion of others. For example, a server may host technology agents that perform analysis of software received from a different asset (in this way functioning as an analysis asset) while at the same time receiving and synthesizing results from technology agents within the enterprise (in this way functioning as a synthesis asset), all while at the same time executing its own software unrelated to the dependency analysis innovations described herein. On the other hand, it is also possible that an asset serves only one function within an enterprise.

Static analysis performed by technology agents may comprise one or more different techniques for a given software type. Some techniques may be common among more than one software type and some techniques may be specific to and only relevant to one particular software type.

In one example, a technology agent configured to perform static analysis is configured to identify and examine source code or binary code as it is laid on disk. One category of software that may be examined is applications. In applications, a technology agent may be configured to identify and analyze database dependencies, annotations, and comments, for example, in addition to perform an analysis of the code itself.

In one example, annotations are analyzed to identify descriptions of database components and the names of any APIs that may be published or consumed by the software being analyzed. A technology agent may be configured to analyze all annotations within a piece of software or may be configured to analyze only selected annotations. In one example, annotations (or particular annotation types) may be identified by users manually as ones that should be analyzed by a technology agent. Users may manually identify for a technology agent how a particular annotation should be analyzed and/or provide a categorization of what information it may be expected to contain.

For example, the exemplary application code shown below uses the JPA annotation method to connect to a database.

```
import javax.persistence.Column;
import javax.persistence.Entity;
import javax.persistence.GeneratedValue;
import javax.persistence.GenerationType;
import javax.persistence.Id;
import javax.persistence.Table;
@Entity
@Table(name = "TABLE")
public class Table {
  @Id
  @GeneratedValue(strategy = GenerationType.SEQUENCE)
  private Long id;
  @Column(name = "COLUMN0")
  private String column0;
  @Column(name = "COLUMN1")
  private String column1;
  @Column(name = "COLUMN2")
  private String column2;
```

A technology agent configured to analyze such software may be configured to analyze the code for the bolded annotations "@Entity," "@Table," "@Generated Value" and "@Column" and record the contents of those annotations. This can be used by a technology agent or synthesis agent to build a hierarchy of the database. For example, from the code above, it is known that TABLE includes columns COLUMN_0, COLUMN_1 and COLUMN_2.

In example shown below, a portion of ServiceNow code includes a reference to a table.

```
myFunction: function ( ) {
var rec = new GlideRecord('my_table');
rec.query( );
while(rec.next( )) {
   gs.print(rec.number + ' exists'); }
}
```

In this example, a technology agent may be configured to analyze the code, identify the bolded reference to the table "my_table" and record an association or dependency between the function "myFunction" (or its parent script if the function was not named) and the table "my_table."

In example shown below, a portion of COBOL code in the program "PROGRAM.cbl" includes a reference to information in a table.

```
*Performs a SQL SELECT to get the firstname of the employee
*with the employee number of 10.
   EXEC SQL SELECT firstnme INTO :Firstnme
   FROM employee
     WHERE empno = '000010' END-EXEC.
```

In this example, a technology agent may be configured to analyze the code, identify the bolded reference to the table "employee" and record an association or dependency between the program "PROGRAM.cbl" and the table "employee." The technology agent may also be configured to record that the table "employee" contains the column "firstname" and that the program "PROGRAM.cbl" includes an association or dependency on that column.

In another example, comments in a piece of software may be analyzed by a technology agent employing natural language processing to identify dependencies contained within the text of a comment in the software code. In one example, an analysis result returned to a synthesis agent may include both any results of such natural language processing as well as the text of the comment itself. The synthesis agent may be configured to receive such information and to logically connect any identified dependencies with the text of the comment in order to maintain the ability to display the comment to a user in connection with any identified dependencies. In this way, a user is provided the ability to confirm or double-check the dependency identification. A user may enter corrections to the identification of any dependency from the text of a comment as a means to correct the natural language processing function. For example, if the natural language processing is provided by artificial intelligence or a neural network employing machine learning capabilities, such corrections may be used to correct and improve the accuracy of the natural language processing.

The code itself may also be analyzed by technology agents to identify dependencies therein. In one aspect, to provide a foundation for subsequent dependency analysis, a piece of software may be analyzed to identify hierarchies within the code. Multiple aspects of the code may be considered a node and assigned a node identifier. For example, a library may be considered a node as well as a class or function within a library, as well as even a portion of code within a function. Other nodes may include databases, tables of a database, columns of a database, variables, etc.

Node identifiers may be, include, or be connected to a hash of content related to the node. For example, a library or function node may be identified based on a hash of the node's entire binary contents. In another example, function identifiers may be, include, or be connected to a hash of the function's signature. Such a function signature may include, for example, the name of the function, the return values of the function and the parameters of the function.

A technology agent may be configured to record a hierarchy of nodes within a piece of software. Such a hierarchy may be used in combination with or instead of a hash of a node's contents to identify the node. For example, a library may be identified both by a hierarchy of nodes within the library and a hash of the library's entire binary contents.

Once a hierarchy is identified, a hash may be computed of the node. Such a hash may include just the hierarchy information or may include the entire contents of the node (including or excluding the hierarchy information). A hash of a library's hierarchy may serve as an identifier for the library.

Static analysis may be performed by technology agents once or for a finite amount of time or on an ongoing basis. For example, static analysis may be performed only during development of an enterprise's software architecture. In another example, static analysis may be performed by technology agents on an ongoing basis. For example, static analysis may be performed every X number of minutes, hours or days. Upon a preset amount of time elapsing, static analysis may be performed again on all assets and nodes within an enterprise or only on a selected number thereof. For example, static analysis of different assets and nodes within an enterprise may be staggered such that each node is analyzed every 8 hours, but each node is not necessarily analyzed at the same time as or synchronously with other or all nodes in the enterprise. Execution of static analysis technology agents may be restricted, for example, based on time of day, current utilization of processing or network communication resources, etc.

In another example, a level of pre-analysis may be performed prior to a subsequent static analysis of a node. In one example, a node's hash may be compared to its hash from a previous execution of static analysis. If the hash is the same, further static analysis is not performed. In the example of a library, for example, a library may only be subsequently analyzed by a static analysis technology agent if a hash of its hierarchy differs from the previously recorded hash of its hierarchy. In another example, a library may only be subsequently analyzed if a hash of its entire binary contents is different than a previous hash of its binary contents. In this way, processing resources may be conserved by not performing static analysis of nodes that have not changed since the last time that it was performed.

In one example, static analysis of a function includes identifying any other functions that are called by that function. A result of such analysis (communicated to a synthesis agent) may be a directional vector between the identifier of the function node being analyzed and the identifier of the function node that is called.

In another aspect, applications may be subjected to static analysis by technology agents to identify APIs, databases (i.e. JDBC calls), message queues and the like that are called by the application. In one example, annotations in an application are analyzed to identify API call exposed or published therein. In connection with the dynamic analysis described in more detail below, dependencies adequately identified during static analysis may be omitted from analysis during dynamic analysis in order to reduce processing resources required. Alternatively, if dependencies can only be partially identified during static analysis, techniques such as byte code injection may be targeted to applications identified during static analysis as having possible dependencies for later analysis by technology agents during dynamic analysis.

For example, a technology agent may be configured to analyze software code for connections that are established from API consumers to API publishers. Portions of exemplary Java application code containing an API call from an API consumer to an API publisher is shown below.

```
@Service
public class Consume {
    @Value(value = "${ip_address}")
    private String ipvalue;
    public void crosscode( ) throws IOException {
        URL conURL = new
        URL("http://"+ipvalue+"/api/call");
        HttpURLConnection conn = null;
        try {
            conn = (HttpURLConnection)conURL.openConnection( );
        } catch (IOException e) {
            e.printStackTrace( );
        }
        conn.setDoOutput(true);
        conn.setRequestMethod("GET");
```

In this example, a technology agent may be configured to dynamically analyze the code to identify API calls by identifying "conURL" references in the code, as shown in bold above.

Similarly, a technology agent may be configured to analyze software code for APIs that are published by API publishers. Portions of exemplary application code publishing an API is shown below.

```
public class Assetcontroller extends BaseController {
    @RequestMapping(value = "/api/v1.0/listAssetsWithTechType",
    method = RequestMethod.POST, consumes =
    MediaType.APPLICATION_JSON_VALUE,
    produces = MediaType.APPLICATION_JSON_VALUE)
    public SearchAssetsResponse
    listAssetsWithTechType(HttpServletRequest httprequest,
    ListAssetsTypeRequest request) throws DatabaseException {
        ...
    }
```

In this example, a technology agent may be configured to analyze the annotations in the byte-code to identify published APIs, as shown in bold above.

In a similar example, a portion of .NET code is shown below that identifies a connection from an API consumer to an API.

```
namespace EdinaCosumer.Controllers
{
    public class Consumercontroller : ApiController
    {
        [System.Web.Http.HttpGet]
        [System.Web.Http.Route("api/index/consume")]
        public string Index1( )
        {
            string p = ConsumerController.FatDateNow( );
            return "Consumer Calling successfull + " + p;
        }
    ...
```

In this example, a technology agent may be configured to identify the "system.web.http.route" call and extract the "api/index/consume" string as the API endpoint.

Static analysis of databases may include, for example, analysis of database schemas to identify dependencies among tables, columns, views, indexes, stored procedures, etc. For example, one technique that may be employed by technology agents is to identify database configuration files and to analyze such files for connections between databases. For example, an ORM database configuration file may identify relationships between databases and between elements of databases. Static analysis of databases may also include analysis of connection logs to identify applications and/or functions that have previously accessed specific aspects of the database.

For example, a technology agent may be configured to analyze Hibernate (a Java framework used by Java applications to interact with databases) configuration files. Portions of an exemplary Hibernate .cfg configuration file are shown below.

```
<?xml version="1.0" encoding="utf-8"?>
<!DOCTYPE hibernate-configuration PUBLIC
"-//Hibernate/Hibernate Configuration DTD 3.0//EN"
"http://hibernate.sourceforge.net/hibernate-configuration-3.0.dtd">
<hibernate-configuration>
    <session-factory>
    ...
        <property
            name="hibernate.connection.url">
            jdbc:mysql://localhost:3109/crosscode</property>
    ...
        <mapping resource=
        "com/crosscode/common/contact.hbm.xml" />
        <mapping resource=
        "com/crosscode/common/inventory.hbm.xml" />
    </session-factory>
</hibernate-configuration>
```

In this example, a technology agent may be configured to identify the bolded hibernate.conneciton.url and resource mapping information from the code. It should be noted that the "localhost" placeholder may be replaced by the technology agent with an IP address of the asset prior to communication of the analysis result to a synthesis agent. From this analysis of the .cfg file, the technology agent may be pointed to relevant .hbm configuration files (for example, "contact.hbm.xml" or "inventory.hbm.xml" shown above).

Portions of an exemplary Hibernate .hbm configuration file are shown below.

```xml
<?xml version="1.0" encoding="UTF-8"?>
<!DOCTYPE hibernate-mapping PUBLIC "-//Hibernate/Hibernate
    Mapping DTD 3.0//EN"
"http://hibernate.sourceforge.net/hibernate-mapping-3.0.dtd">
<hibernate-mapping>
    <class name="com.hibernate.contact" table="contact">
        <id column="ID" name="id"
        type="java.lang.Integer" />
        <property column="NAME" name="Name"
        type="java.lang.String" />
        <property column="EMAIL" name="email"
        type="java.lang.String" />
        <property column="PHONE" name="phone"
        type="java.lang.String" />
        <property column="CITY" name="city"
        type="java.lang.String" />
        <property column="STATE" name="state"
        type="java.lang.String" />
    </class>
</hibernate-mapping>
```

In this example, the table and column information is analyzed and extracted by the technology agent.

In the example shown below, a portion of software code includes a JDBC call that establishes a connection to a database.

```
public class OracleDatabaseRemote {
public static void main(String[ ] args) {
    try
    {
        Class.forName("oracle.jdbc.driver.OracleDriver");
        Connection
    con=DriverManager.getConnection
        ("jdbc:oracle:thin:@host:1521:oracle","user","pass");
    ...
```

In this example, a technology agent may be configured to analyze and extract the connection information shown in bold above. A technology agent performing subsequent dynamic analysis may be configured to use this extracted identification of the database connection to perform its dynamic analysis of the execution of code using this connection.

In another aspect, technology agents may be configured to perform dynamic analysis of software that is executing at the same time as the analysis is being performed. Technology agents configured to perform dynamic analysis may perform such analysis on all software in an enterprise or on a selected subset of software. For example, while static analysis may be performed on all or nearly all of the software in an enterprise for which technology agents have been configured, only a subset of such software may be dynamically analyzed by technology agents (for example, only Java or .NET applications).

In one aspect of dynamic analyses that may be performed by technology agents, API consumers may be identified and analyzed. For example, popular libraries may be identified before commencing dynamic analysis and calls to those libraries may be logged during run-time as a dependency between the source of the call (e.g., IP address, asset name, consumer method, application and/or function) and the library and function within the library. In another example, calls to all libraries may be monitored and analyzed. In still another example, libraries may be monitored for calls and popular libraries may be identified for dynamic dependency analysis. In this example, processing resource requirements may be decreased over monitoring all libraries or even a pre-selected set of libraries where some may not be utilized as much as others.

In another aspect of dynamic analysis, message queues may be monitored by one or more technology agents to identify producers and consumers of messages. For example, a Kafka technology agent may be employed at an asset to monitor production and consumption of messages in a Kafka message queue. In another example, a technology agent may be configured to analyze publish and consume libraries that interface with message queues to identify dependencies. A result of a dynamic analysis of a message queue may contain, for example, a list of topics that are published to or consumed from as well as an identification of each producer and/or consumer.

In the example shown below, a portion of software application code includes a connection made by a Kafka consumer to message topics.

```
private KafkaConsumer<String, Strings consumer;
public void start(String topicName) throws InterruptedException {
    Properties props = new Properties( );
    props.put("bootstrap.servers", "localhost:9092");
    ...
    KafkaConsumer<String, String> consumer = new
    KafkaConsumer
        <String, String>(props);
    consumer.subscribe(Arrays.asList(topicName));
    ...
    }
}
```

In this example, a technology agent may be configured to identify the code shown in bold above and monitor the consumption of Kafka topics established thereby in real time during dynamic analysis.

Similarly, in the example shown below, a portion of software application code includes establishment of a Kafka topic that is produced.

```
...
import org.apache.kafka.clients.producer.KafkaProducer;
public class KafkaProducer {
public static void runProducer(String topicName, int i) throws
    InterruptedException, IOException {
    Properties props = new Properties( );
        props.put("bootstrap.servers", "hostname:9092");
        ...
        Producer<String, String> producer = new KafkaProducer
            <String, String>(props);
        ProducerRecord prodRec= new ProducerRecord<String,
    String>(topicName,
            Integer.toString(i), Integer.toString(i));
            producer.send(prodRec);
        ...
    }
```

In this example, a technology agent may be configured to identify the code shown in bold above and monitor the production of the Kafka topic established thereby in real time during dynamic analysis.

In yet another aspect of dynamic analysis, database calls may be monitored and analyzed to identify which aspects of a database are interacted with by software within an enterprise, including the nature of such interaction.

Results that may be communicated from technology agents to synthesis agents include, for example, hierarchy information describing the hierarchy of nodes within an enterprise as well as dependency information describing which nodes are dependent on which other nodes (as a producer or consumer or both). Synthesis agents receive these results from among technology agents at an asset and from among the assets in an enterprise. As discussed above, core agents may assist in facilitating communication of analysis results from an asset to one or more synthesis agents. For example, a core agent may be configured to collect analysis results from technology agents at an asset, encrypt them, and then communicate the encrypted results to a third-party server at which a synthesis agent decrypts them and performs its work.

Synthesis agents may be configured to compile dependency analysis results received from throughout an enterprise in a relational database. Technology agents may be configured to include with their results time information such that synthesis agents are provided the ability to map changes to the results over time. The end result of the one or more synthesis agents is a dependency graph (in as many dimensions as is necessary) that records the hierarchy and dependencies among all nodes in an enterprise.

Synthesis agents may be configured to identify duplicated software in an enterprise, for example based on hashes of nodes' hierarchy and/or contents. Dependencies among copies of a piece of software may be merged into a common record by the synthesis agents.

Users may also be provided the ability to manually add planned assets and/or nodes to an enterprise's dependency graph. The manual addition of planned assets and/or nodes may also include the manual addition of planned dependencies in relation to other assets and/or nodes in the enterprise. Such planned assets and/or nodes may later be supplanted by actual assets and/or nodes as they enter the enterprise. In this way, the potential impact of adding planned assets and/or nodes to an enterprise can be forecast in advance without the need to find out in a live environment where dependencies may arise.

FIG. 1 and the code snippets provided in this disclosure are conceptual illustrations allowing for an explanation of the present disclosure. It should be understood that various aspects of the embodiments of the present disclosure could be implemented in hardware, firmware, software, or combinations thereof. In such embodiments, the various components and/or steps would be implemented in hardware, firmware, and/or software to perform the functions of the present disclosure. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the disclosure as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, the applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others can, by applying knowledge within the skill of the relevant art(s), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

In order to address various issues and advance the art, the entirety of this application for SYSTEMS AND METHODS FOR DEPENDENCY ANALYSIS (including the Cover Page, Title, Abstract, Headings, Cross-Reference to Related Application, Background, Brief Summary, Brief Description of the Drawings, Detailed Description, Claims, Figures, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of an individual and/or enterprise user, database configuration and/or relational model, data type, data transmission and/or network framework, syntax structure, and/or the like, various embodiments may be implemented that enable a great deal of flexibility and customization. While various embodiments and discussions have included reference to particular applications, it is to be understood that the embodiments described herein may be readily configured and/or customized for a wide variety of other applications and/or implementations.

What is claimed is:

1. A computer-implemented method for analyzing software dependencies, comprising:
   on a first asset, executing a first technology agent configured to:
      analyze a first type of software stored in memory of the first asset, the analysis comprising:
         identifying nodes within a particular portion of software of the first type,
         for each node, assigning an ID,
         recording a hierarchy of the nodes within the software using the node IDs,
         performing a static analysis of the particular portion of software of the first type to identify any dependencies between that particular portion of software and other portions of software, and
         communicating the hierarchy and the dependencies to a synthesis agent;
   on the first asset, executing a second technology agent configured to:
      analyze a second type of software stored in memory of the first asset, the analysis comprising:
         identifying nodes within a particular portion of software of the second type,
         for each node, assigning an ID,
         recording a hierarchy of the nodes within the software using the node IDs,
         performing a static analysis of the particular portion of software of the second type to identify any dependencies between that particular portion of software and other portions of software, and
         communicating the hierarchy and the dependencies to the synthesis agent; and
   on the first asset, executing a third technology agent configured to:
      analyze a particular type of software executing on the first asset, the analysis comprising:
         performing a dynamic analysis of a particular portion of software of the particular type executing on the first asset to identify any dependencies between that particular portion of software and other portions of software, and
         communicating the identified dependencies to the synthesis agent.

2. The method of claim 1, wherein the first technology agent and second technology agent are provided within a core agent.

3. The method of claim 1, wherein the synthesis agent resides on the first asset.

4. The method of claim 1, wherein the synthesis agent resides on an asset different than the first asset, both assets being within the same enterprise.

5. The method of claim 1, wherein the synthesis agent resides at an asset outside an enterprise of the first asset.

6. The method of claim 1, wherein the synthesis agent is configured to analyze the results from the first technology agent and the second technology agent to synthesize a dependency graph that records the hierarchy and dependencies among the identified nodes.

7. The method of claim 1, wherein the analysis performed by the third technology agent is based at least in part on any dependencies identified by the first technology agent.

8. A computer-implemented method for analyzing software dependencies, comprising:
   on a first asset, executing a first technology agent configured to:
      analyze a particular portion of software stored in memory of the first asset, the analysis comprising:
         identifying nodes within the particular portion of software,
         for each node, assigning an ID,
         recording a hierarchy of the nodes within the software using the node IDs,
         performing a static analysis of the particular portion of software to identify any dependencies between that particular portion of software and other portions of software, and
         communicating the hierarchy and the dependencies to a synthesis agent; and
   on a second asset, executing a second technology agent configured to:
      analyze a particular portion of software stored in memory of the second asset, the analysis comprising:
         identifying nodes within the particular portion of software,
         for each node, assigning an ID,
         recording a hierarchy of the nodes within the software using the node IDs,
         performing a static analysis of the particular portion of software to identify any dependencies between that particular portion of software and other portions of software, and communicating the hierarchy and the dependencies to a synthesis agent;

and on the first asset, executing a third technology agent configured to:

analyze software executing on the first asset, the analysis comprising:

performing a dynamic analysis of a particular portion of software executing on the first asset to identify any dependencies between that particular portion of software and other portions of software, and communicating the identified dependencies to the synthesis agent.

9. The method of claim 8, wherein the synthesis agent resides on one of the first asset and the second asset.

10. The method of claim 8, wherein the synthesis agent resides on an asset different than the first asset and the second asset, but on an asset within a same enterprise as the first and second assets.

11. The method of claim 8, wherein the synthesis agent resides at an asset outside an enterprise of the first and second assets.

12. The method of claim 8, wherein the synthesis agent is configured to analyze the results from the first technology agent and the second technology agent to synthesize a dependency graph that records the hierarchy and dependencies among the identified nodes.

13. The method of claim 8, wherein the analysis performed by the third technology agent is based at least in part on any dependencies identified by the first technology agent.

* * * * *